United States Patent
Okumura

Patent Number: 5,448,425
Date of Patent: Sep. 5, 1995

[54] METHOD FOR ERASING INFORMATION RECORDED ON MAGNETIC TAPE WITH REDUCED RESIDUAL MAGNETIZATION

[75] Inventor: Toshiyuki Okumura, Tokyo, Japan

[73] Assignee: NEC Corporation, Tokyo, Japan

[21] Appl. No.: 259,349

[22] Filed: Jun. 14, 1994

Related U.S. Application Data

[62] Division of Ser. No. 983,161, Nov. 30, 1992, abandoned.

[30] Foreign Application Priority Data

Nov. 29, 1991 [JP] Japan .................. 3-315856

[51] Int. Cl.$^6$ .................................................. G11B 5/03
[52] U.S. Cl. .................................................. 360/66
[58] Field of Search .................................. 360/118, 66

[56] References Cited

U.S. PATENT DOCUMENTS

| | | | |
|---|---|---|---|
| 4,466,027 | 8/1984 | Howell et al. | 360/66 |
| 4,622,614 | 11/1986 | Yamashita et al. | 360/66 |
| 4,851,936 | 7/1989 | Soga | 360/66 |

FOREIGN PATENT DOCUMENTS 60-89806  5/1985  Japan .................. 360/118

OTHER PUBLICATIONS

K. Yamashita, et al. "Sendust Sputtered Ferrite Flying Erase Head", IEEE Transaction Magnetics, vol. MAG 20, No. 5, 1984.

*Primary Examiner*—Aristotelis Psitos
*Assistant Examiner*—Won Tae C. Kim

[57] ABSTRACT

A method for erasing information recorded on a magnetic tape by a magnetic erase head having a magnetic core having a magnetic gap of a predetermined width and a coil wound on the core. An erasing current is flown through the coil to generate an erasing magnetic field above the magnetic gap. The magnetic field generated by that current has a profile defined by a first zero point, first and second peak points, and a second zero point above the magnetic erase head. The magnetic tape having information recorded therein through the magnetic field is moved above the magnetic erase head. The frequency of the erasing current and a moving speed of the magnetic tape relative to the magnetic erase head are set such that the magnetic field changes in phase at least three times during a time in which the magnetic tape is moved in a moving direction of the magnetic tape by a distance which is determined by the first zero point and the first peak point of the magnetic field profile.

4 Claims, 5 Drawing Sheets

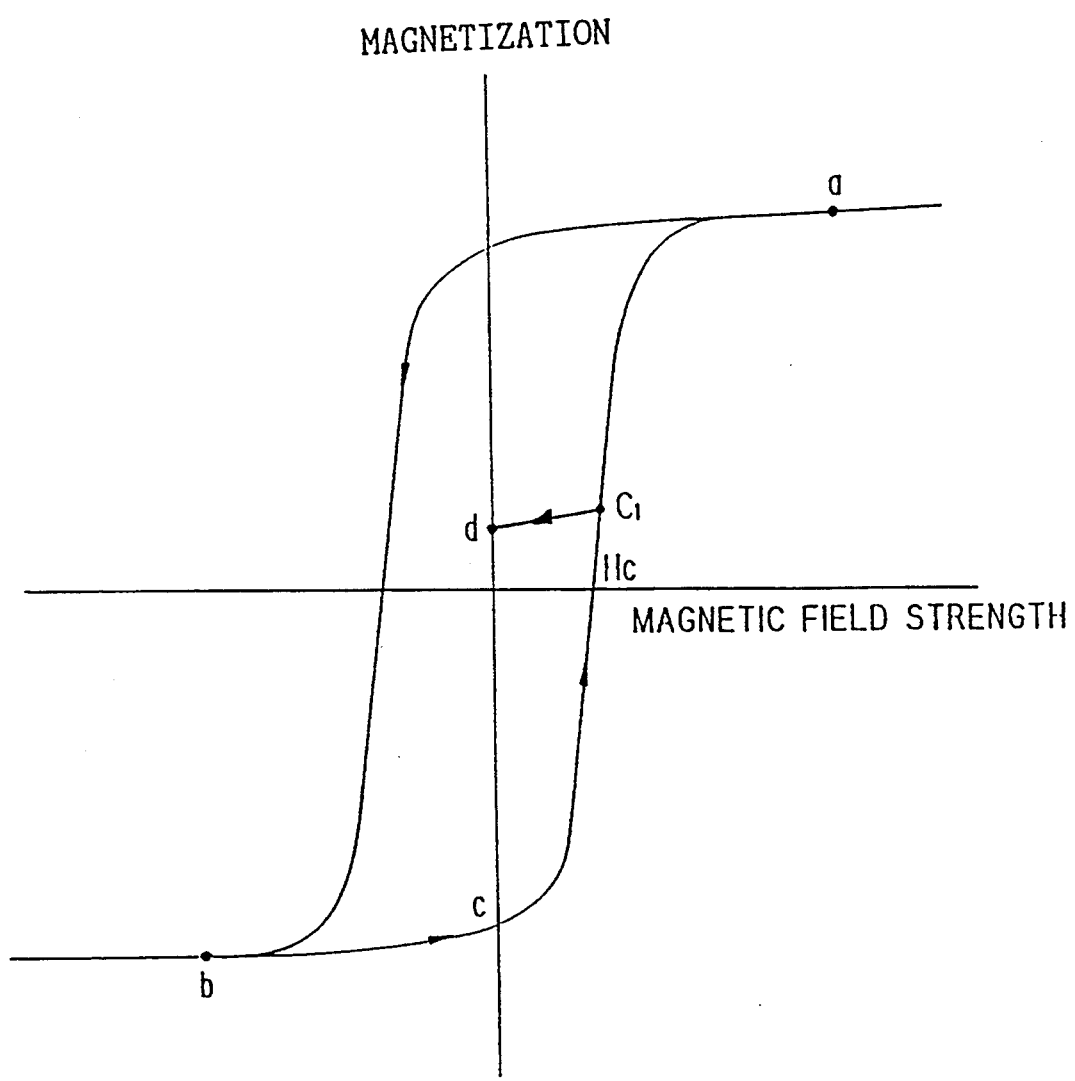

METHOD FOR ERASING INFORMATION RECORDED ON MAGNETIC TAPE WITH REDUCED RESIDUAL MAGNETIZATION

CROSS-REFERENCE TO RELATED APPLICATION

This application is a Rule 1.62 division of application Ser. No. 07/983,161 filed Nov. 30, 1992 abandoned.

FIELD OF THE INVENTION

This invention relates to a magnetic erase head for a magnetic recording apparatus, and more particularly to, a magnetic erase head used in a helical scanning type magnetic recorder.

BACKGROUND OF THE INVENTION

In a helical scanning type magnetic tape recorder, a flying erasing method has been mostly used for erasing signals recorded on a magnetic tape. A magnetic erasing system of the flying erase type includes a magnetic erase head from which an erasing magnetic field is generated.

One of conventional magnetic erasing systems is described on pages 869 to 871 in the report "IEEE TRANSACTIONS ON MAGNETICS", volume MAG 20, No. 5. In this report, a magnetic erase head is driven with an erase current of more than 100 mA, in which the relative tape-to-head speed is 3.8 m/s and an erase frequency is 5 MHz. In the report, the polarity of a magnetic field generated from the magnetic erase head is inverted twice to increase the erasing effect within a time in which a magnetic tape is moved over a length of one-thirds of a gap provided in a magnetic core.

According to the conventional magnetic erase system, however a large residual magnetization recorded by the erase head may be left on the magnetic tape due to the large erasing current of 100 mA as described before, so that crosstalk occurs on a reproduced signal. For the purpose of reducing this crosstalk, an azimuth angle is assigned to a recording and reproducing (read and write) head. However, this is not sufficient to remove crosstalk completely.

Further, where a magnetic tape having a high coercive force is used, it is difficult to erase the recorded signals completely. To solve such problem, it can be proposed that an erasing magnetic filed is increased by increasing the level of an erase current. However, a large electric power is required to drive the magnetic erase head. Further, it can be proposed that an erasing magnetic field is increased by increasing the winding number of the head coil turns. However, an impedance of the magnetic erase head is increased, so that a large electric power is required to drive the head.

SUMMARY OF THE INVENTION

Accordingly, it is an object of the invention to provide a magnetic erase head for a magnetic recording apparatus by which a recorded signal on a magnetic tape can be erased without the occurrence of crosstalk on a reproduced signal.

It is another object of the invention to provide a magnetic erase head for a magnetic recording apparatus by which a recorded signal on a magnetic tape can be erased without the increase of power consumption.

According to the invention, in a magnetic recording apparatus comprising a magnetic erase head and a magnetic recording and reproducing head which are mounted on a rotating drum and a magnetic tape which is moved around a portion of an outer periphery of the rotating drum, the magnetic erase head being preceded to the magnetic recording and reproducing head for erasing information recorded in the magnetic tape;

the magnetic erase head, comprising:

a magnetic core which is provided with a magnetic gap of predetermined length; and a coil through which an erase current of a predetermined frequency flows to generate an erasing magnetic field above the magnetic gap;

wherein the magnetic core is structured to provide a predetermined length-between a first position, at which a strength of the erasing magnetic field is zero, and a second position, at which the strength is a maximum value, in a direction of moving the magnetic tape, the predetermined length being at least one-thirds of the predetermined length of the magnetic gap.

The other objects and features of this invention will become understood from the following description with reference to the accompanying drawings.

BRIEF DESCRIPTION OF THE DRAWINGS

FIG. 5 is a hysteresis curve showing operation of the first preferred embodiment.

DESCRIPTION OF THE PREFERRED EMBODIMENTS

For better understanding the background of the present invention, the basic principle of the conventional technology is first described hereinafter with reference to FIG. 1.

Figure 1:
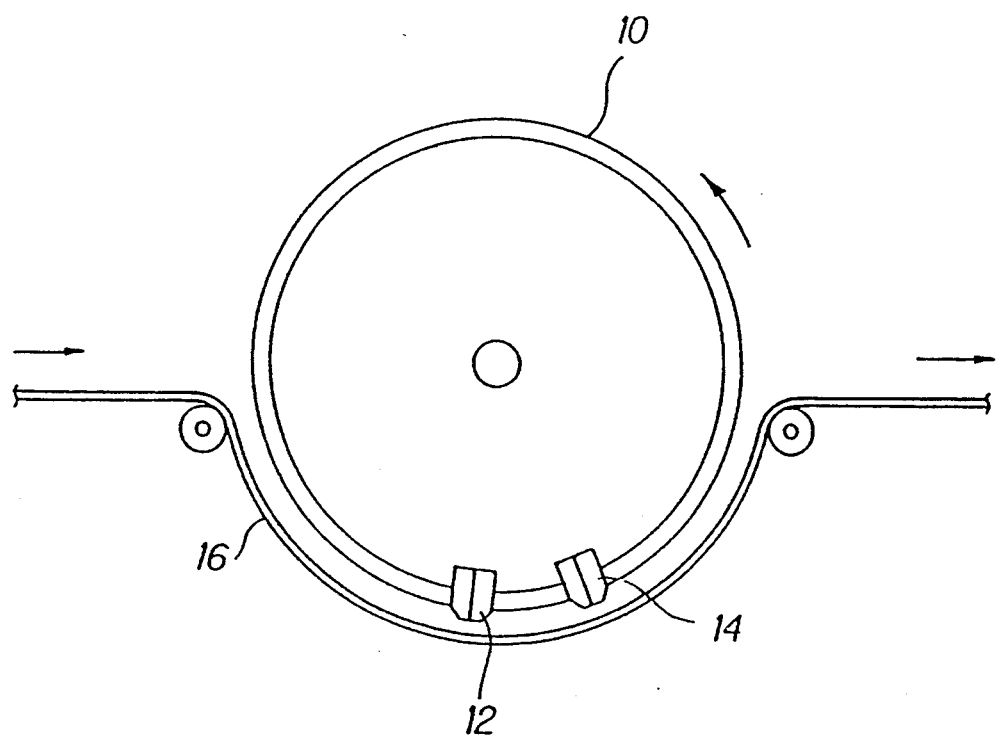
FIG. 1 is a schematic view illustrating a typical magnetic recording apparatus.

FIG. 1 shows a typical magnetic recording apparatus which includes a rotating drum 10 on an outer periphery portion of which a magnetic tape 16 slides with a predetermined speed, a recording and reproducing magnetic head 12 mounted on the rotating drum 10, and a magnetic erase head 14 mounted precedently in position to the recording and reproducing magnetic head 12 on the rotating drum 10. In this figure, the rotating drum 10 rotates in the counterclockwise direction, and the magnetic tape 16 moves left to right, respectively, as shown by solid line arrows.

In the magnetic recording apparatus, a predetermined signal is recorded and reproduced to or from the magnetic tape 16 by the recording and reproducing magnetic head 12. Prior to the recording, the magnetic erase head 14 is driven to erase a signal which has been recorded on the magnetic tape 16.

Figure 2:
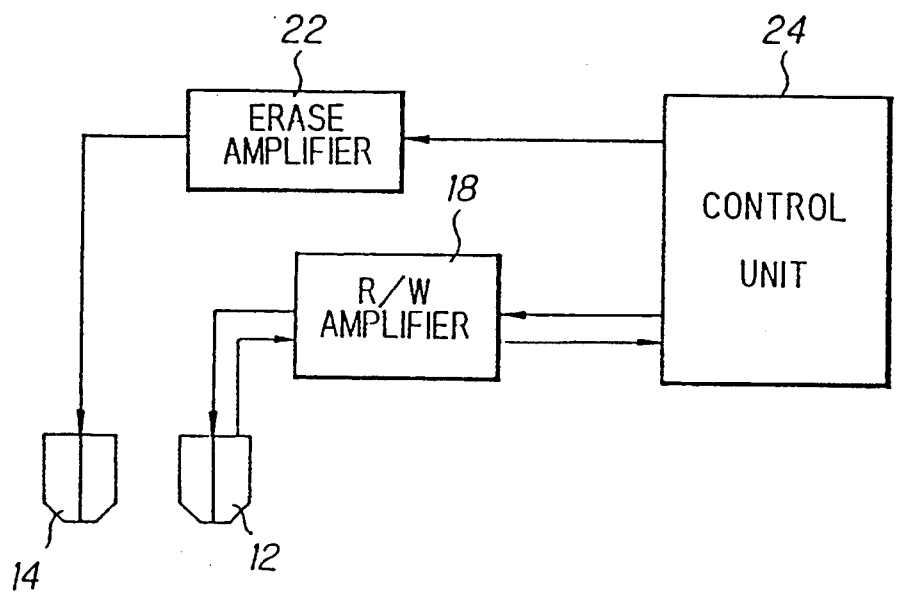
FIG. 2 is a block diagram illustrating a control system for the magnetic recording apparatus shown in FIG. 1.

FIG. 2 shows a control system for the magnetic recording apparatus shown in FIG. 1. The system includes a read and write (R/W) amplifier 18 connected to a recording and reproducing magnetic head 12 for amplifying recording and reproducing signals, an erase amplifier 22 connected to a magnetic erase head 15 for amplifing an erasing current signal, and a control unit 24 connected to the R/W amplifier 18 and the erase amplifier 22 for controlling them, respectively. The control unit 24 supplies a recording signal and an erasing current having a predetermined frequency to the R/W amplifier 18 and the erase amplifier 22, respectively, and is supplied with a predetermined signal from the R/W amplifier 18.

Figure 3:
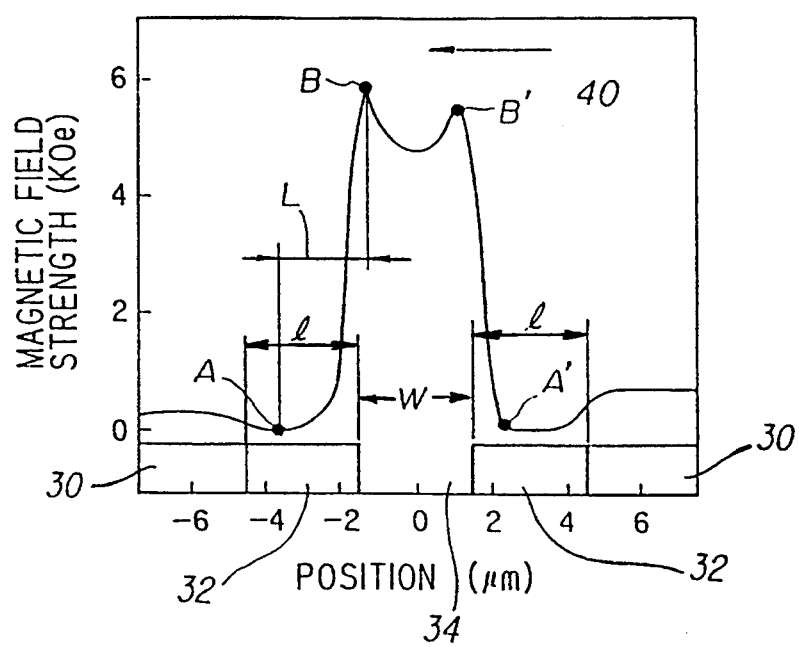
FIG. 3 is an explanatory diagram including a graph of a erasing magnetic field of a magnetic erase head of a first preferred embodiment according to the invention.

FIG. 3 shows a magnetic erase head for a magnetic recording apparatus of a first preferred embodiment according to the invention. The magnetic erase head comprises a magnetic head core 30 of ferrite which is provided with a magnetic gap 34, and a coil (not shown) wound around the magnetic core 30. In this preferred embodiment, a width of the magnetic gap 34 is 3 μm, and the magnetic head core 30 is coated on gap faces with a magnetic layer 32 of sendust having a saturation magnetic flux density greater than that of the magnetic head core 30. A length l of the magnetic layer 32 is 3 μm. In accordance with the structure of the magnetic erase head, an erasing magnetic field is generated as shown by a curve having two zero values A and A' and two peak values B and B', in which a magnetic tape (not shown) is moved in a direction as shown by an arrow 40. The erasing magnetic field is defined, such that a length L of the tape moving direction between the maximum value point B and the zero value point A is equal to or greater than one thirds of the magnetic gap width W. In this preferred embodiment, the length L is 1 μm which is greater than a conventional one because the high saturation magnetic flux density layer 32 is provided.

Figure 4:
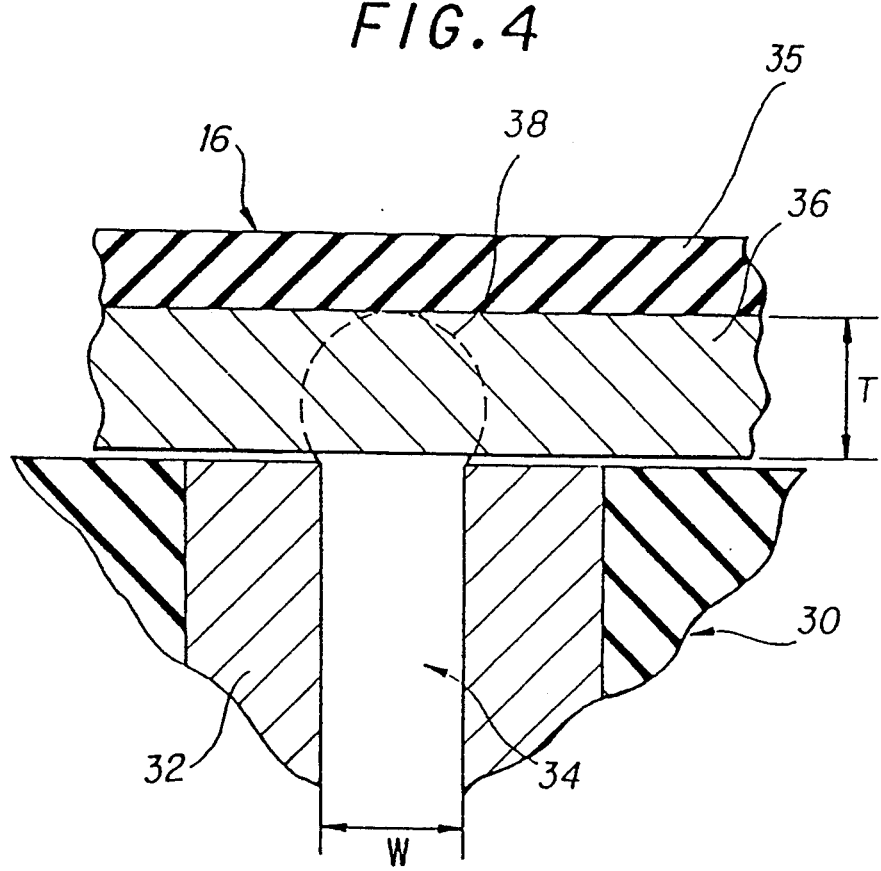
FIG. 4 is a cross-sectional view illustrating a magnetic erase head of the first preferred embodiment and a second preferred embodiment according to the invention.

FIG. 4 shows the magnetic erase head as explained in FIG. 3, wherein like parts are indicated by like reference numerals. In this illustration, the magnetic tape 16 is shown to include a non-magnetic base film 35 and a magnetic film 36 having a predetermined thickness T.

Next, operation of a conventional magnetic erase head and the magnetic erase head of the first preferred embodiment will be explained in FIG. 5.

In the conventional magnetic erase head, it is assumed that a tape-to-head speed is 3.8 m/s, and a frequency of an erasing current is 5 MHz to provide a wavelength of 0.76 μm thereof. Thus, the magnetic tape is subject to the two-times inversion of the erasing magnetic field in a time in which it is moved by the aforementioned length L. Consequently, the strength of the erasing magnetic field which is applied to the magnetic tape 16 changes in accordance with points "a" to "b", and "b" to "c" as shown in FIG. 5. As a result, a residual magnetization as much as a level "c" is left on the magnetic tape.

On the other hand, the frequency of the erasing current is increased greater than 5 MHz, so that the magnetic tape is subject to the three-times inversion of the erasing magnetic field. Consequently, the change "a" to "b", "b" to "c", and "c" to "$c_1$" of the erasing magnetic field is applied to the magnetic field 16, so that the residual magnetization is decreased to a level "d", as shown in FIG. 5.

In the invention, a frequency f of the erasing current is determined as explained below.

As described before, $$L \geq W/3 \quad (1)$$

If it is assumed that a tape-to-head speed is V[m/s], a time $t_1$ in which the magnetic tape 16 is moved by the length L is defined by an equation (2).

$$t_1 = L/V \text{ [s]} \quad (2)$$

A time $t_2$ required for the three-time inversion of the erasing magnetic field is 1/f, and it is also required as defined by an equation (3).

$$t_1 > t_2 \quad (3)$$

Then, an equation (4) is obtained.

$$f \geq V/L = 3V/W \text{ [Hz]} \quad (4)$$

Figure 6:
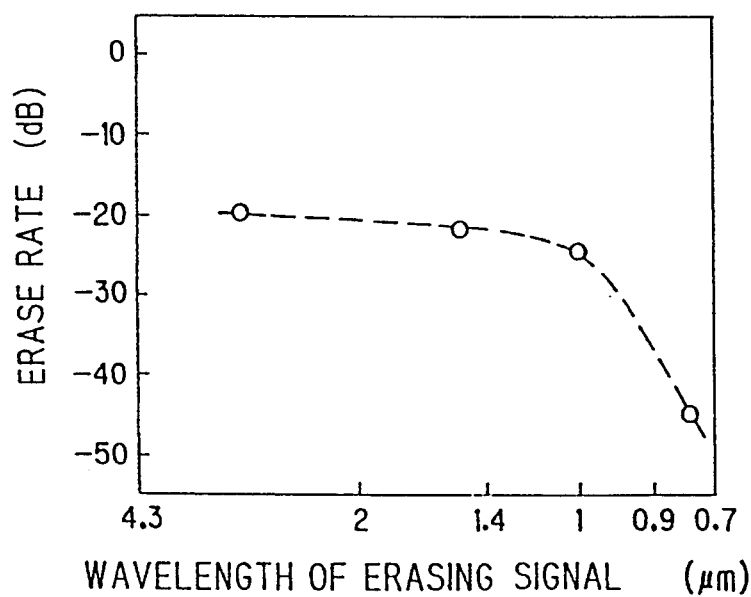
FIG. 6 is a graph showing an erase rate of the first preferred embodiment.

FIG. 6 shows result of an experiment conducted by the inventor, in which a tape-to-head speed is 21.4 m/s. As apparent from the results, the erase rate becomes high, as a wavelength of the erasing current becomes short to apply the three-time inversion of an erasing magnetic field.

Referring again to FIG. 4, it is shown that the magnetic erase head comprises the head core 30 which is provided with the head gap 34 of the width W and the magnetic layer 32 coated on the gap faces of the head gap 34, and the magnetic tape 16 comprises the base film 35 and the magnetic layer 36 of a thickness T, wherein a magnetic field 38 shown by a dotted line penetrates the entire thickness of the magnetic layer 36.

Figure 7:
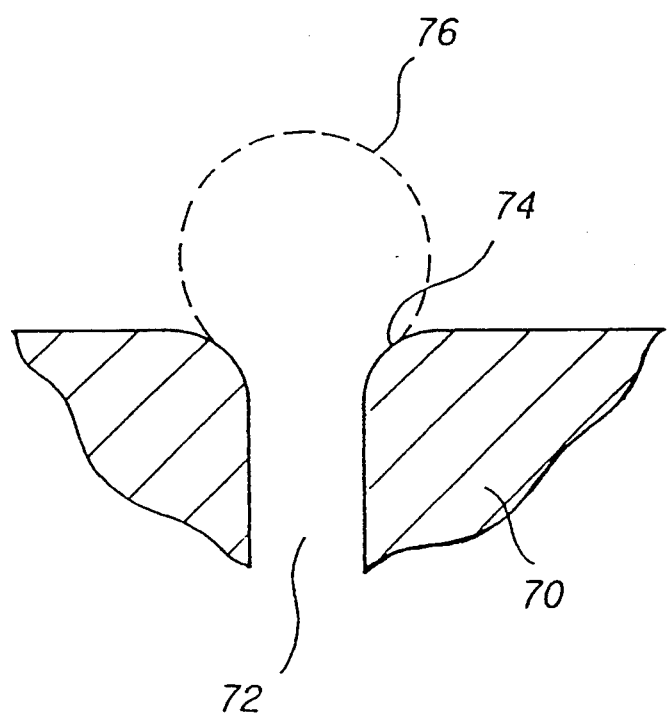
FIG. 7 is a cross-sectional view illustrating a magnetic erase head of a third preferred embodiment according to the invention.

FIG. 7 shows a head core 70 of a magnetic erase head for a third preferred embodiment according to the invention, wherein only the outer profile of the head core 70 is shown, and the aforementioned magnetic layer coated on gap faces and the magnetic tapes are not shown in order to make the illustration simple. The head core 70 has a head gap 72 having a gap edge 74 shaped to be round. According to the third embodiment, a magnetic field 76 is generated from the outside of the head gap 72. Therefore, a point from which the strength of the erasing magnetic field is increased shifts to the outside of the head gap 72. Thus, the strength of the erasing magnetic field changes the peak value to the zero value gradually. As a result, it becomes easier that the polarity of the erasing magnetic field is inverted more than three times within a time in which the magnetic tape 16 is moved over the aforementioned length L, because it becomes long without the increase of the width W.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A method for erasing information recorded in a magnetic tape with a reduced residual magnetization by a magnetic erase head, comprising the steps of:

providing a magnetic erase head comprising a head core having a magnetic gap and a coil wound on said head core;

generating a magnetic field having a profile defined by a first zero point, first and second peak points, and a second zero point above said magnetic erase head by an erasing current flowing through said coil wound on said head core;

moving a magnetic tape having information recorded therein through said magnetic field above said magnetic erase head; and setting a frequency of said erasing current and a moving speed of said magnetic tape relative to said magnetic erase head so that said magnetic field changes in phase three times during a time in which said magnetic tape is moved in a moving direction of said magnetic tape by a distance which is determined by said first zero point and said first peak point of said magnetic field profile.

2. A method for erasing information recorded in a magnetic tape with a reduced magnetization by a magnetic erase head, according to claim 1, wherein:

said frequency of said erasing current, said moving speed of said magnetic tape relative to said magnetic erase head, and said distance of said magnetic field profile meet an equation defined below, $$f \geq V/L$$

where f is said frequency, V is said moving speed, and L is said distance.

3. A method for erasing information recorded in a magnetic tape with a reduced residual magnetization by a magnetic erase head, comprising the steps of:

providing a magnetic erase head comprising a head core having a magnetic gap and a coil wound on said head core, said head core being coated on faces of said magnetic gap with magnetic layers having a saturation magnetic flux density greater than said head core;

generating magnetic field having a profile defined by a first zero point, first and second peak points, and a second zero point above said magnetic erase head by an erasing current flowing through said coil wound on said head core, said first and second zero points being defined by said magnetic layers, and said first and second peak points being defined by said magnetic gap;

moving a magnetic tape having information recorded therein through said magnetic field above said magnetic erase head; and setting a frequency of said erasing current and a moving speed of said magnetic tape relative to said magnetic erase head so that said magnetic field changes in phase three times to minimize said reduced magnetization during a time in which said magnetic tape is moved in a moving direction of said magnetic tape by a distance which is determined by said first zero point and said first peak point of said magnetic field profile.

4. A method for erasing information recorded in a magnetic tape with a reduced magnetization by a magnetic erase head, according to claim 3, wherein:

said frequency of said erasing current, said moving speed of said magnetic tape relative to said magnetic erase head, and said distance of said magnetic field profile meet an equation defined below, $$f \geq V/L$$

where f is said frequency, V is said moving speed, and L is said distance.

* * * * *